(No Model.)
W. S. WELLS.
EYEGLASSES.
No. 412,442. Patented Oct. 8, 1889.
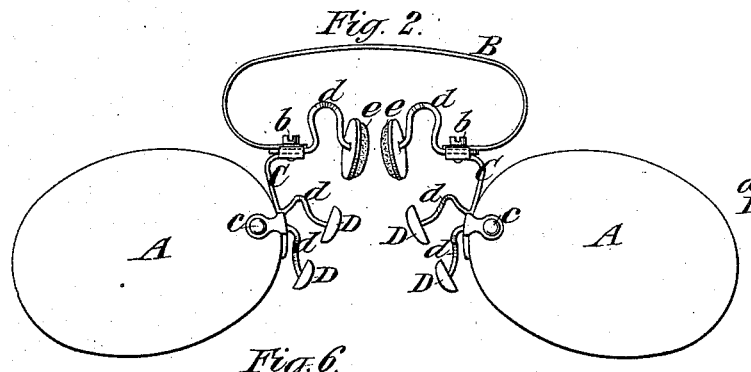
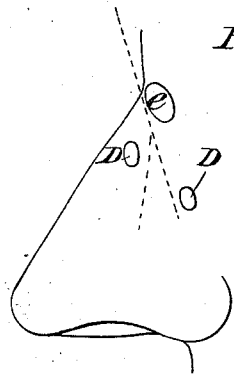
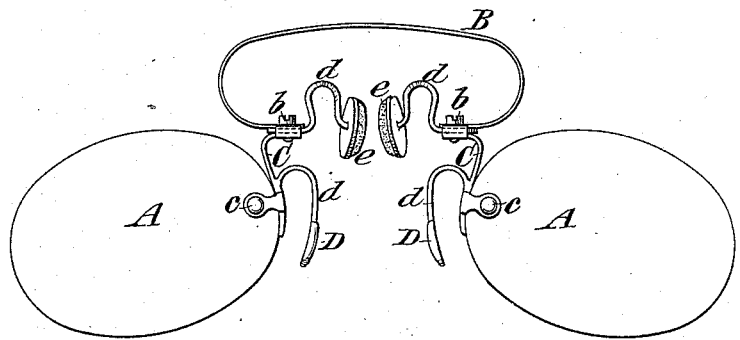
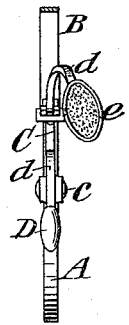
Witnesses:
O. L. Sundgren
Arthur H. Gambler
Inventor:
Walter S. Wells
by attorneys
Brown & Griswold
N. PETERS, Photo-Lithographer, Washington, D. C.

UNITED STATES PATENT OFFICE.

WALTER S. WELLS, OF NEW YORK, N. Y.

EYEGLASSES.

SPECIFICATION forming part of Letters Patent No. 412,442, dated October 8, 1889.

Application filed November 10, 1888. Serial No. 290,494. (No model.)

*To all whom it may concern:*

Be it known that I, WALTER S. WELLS, of New York, in the county and State of New York, have invented a certain new and useful Improvement in Eyeglasses, of which the following is a specification.

I will describe in detail an eyeglass embodying my improvement and then point out the novel features in claims.

In the accompanying drawings, Figure 1 is a face view of an eyeglass embodying my improvement. Fig. 2 is a similar view illustrating a modification thereof. Fig. 3 is a side view of the example of my improvement shown in Fig. 1. Fig. 4 is a side view of the example shown in Fig. 2. Fig. 5 is a diagrammatic view showing the position of the eyeglass upon the nose and the arrangement of the pads, as illustrated in Figs. 2 and 4. Fig. 6 is a detail view showing the mode of attachment of certain of the nose-pads for the glasses.

Similar letters of reference designate corresponding parts.

A designates the lenses of the eyeglasses, which may or may not be mounted in rims.

B designates the spring by which the glasses are held upon the nose.

C designates posts or standards secured to the lenses, as here shown, by rivets c.

In the example of my improvement shown in Figs. 1 and 3, D designates pads secured upon downwardly-extending arms d, which arms form part of or are secured to the posts or standards C. The pads D in this example of my improvement are in the same plane as the lenses of the glasses, and when in use bear against the cartilaginous portions of the nose. The posts or standards C have upwardly-extending portions, to which portions the spring B of the glasses is attached. In the example of my improvement shown such attachment is effected by means of screws b, passing through suitable apertures in the inwardly-turned ends of the spring and in the upwardly-extending portions of the posts or standards C. I prefer that the posts or standards C and the downwardly-extending portions d, which bear the pads D, shall be made integral.

Secured to the upwardly-extending portions of the posts or standards C are arms d, which arms bear at their extremities pads e. As shown in Fig. 6, these arms are adjustable upon the upwardly-extending portions of the posts or standards C, so that the pads may be brought nearer to or farther from each other, as desired. Such adjustment is secured by providing the portions of the arms d, which are secured to the upwardly-extending portions of the posts or standards C, with longitudinally-extending slots f, as more clearly shown in Fig. 6. It will be observed that the pads e are considerably above the axes of the lenses, and that they have a backward and downward extension. This is more clearly illustrated in Figs. 3 and 4.

In the example of my improvement shown in Figs. 2 and 4, and in the diagrammatic Fig. 5, I employ a modification of the nose pad or pads D. This modification consists of two pads D, which pads are mounted upon two arms d, extending from the posts or standards C. By reference to the diagrammatic view, Fig. 5, and to Fig. 4, it will be clearly seen that one of the pads D in this example of my improvement is arranged in approximately the same plane as the lenses of the glasses, while the other is above and at the back of the said plane. It will also be observed that the pads D in this example, together with the pads e, are arranged approximately at the points of a triangle; or, in other words, the pads D and e have a triangular bearing upon the nose.

In all the examples of my improvement shown the pads e, when secured by the screws b, have a rigid connection with the upwardly-extending portions of the posts or standards C.

By my improvement I provide an eyeglass which is adapted to grasp the fleshy portion of the nose by pads which are rigidly secured and prevent any swiveling or rocking movement, and also other pads adapted to grasp the cartilaginous portion of the nose and to act as steadiments.

What I claim as my invention, and desire to secure by Letters Patent, is—

1. In an eyeglass, the combination, with lenses, of posts or standards secured to said lenses and having portions extending upwardly beyond the axes of said lenses, and pads for the nose mounted upon and rigidly secured to said upwardly-extending portions, substantially as specified.

2. In an eyeglass, the combination, with lenses, of posts or standards secured thereto, and bearing-pads for the nose, and other pads for the nose mounted upon and rigidly secured to upwardly-extending portions of said posts or standards, substantially as specified.

3. In an eyeglass, the combination, with lenses, of posts or standards having portions extending upwardly above the axes of said lenses, nose-pads adapted to grip the nose and secured to said posts or standards, and other nose-pads rigidly secured to said upwardly-extending portions above the pads first named and having a backward and downward extension, said last-named pads being also adapted to grip the nose, substantially as specified.

4. In an eyeglass, the combination, with lenses, of posts or standards secured thereto, nose-pads secured to said posts or standards and adapted to grip the nose, and other nose-pads rigidly secured to said standards above and to the rear of the nose-pads first named, and also adapted to grip the nose, substantially as specified.

5. In an eyeglass, the combination, with lenses, of posts or standards secured thereto, pads for the nose rigidly secured to said posts or standards, certain of said pads being arranged in the same plane as the lenses and other of said pads being arranged above the other pads and to the rear thereof, substantially as specified.

6. In an eyeglass, the combination, with lenses, of posts or standards secured to said lenses and having upwardly-extending portions above the axes of the lenses, pads secured to said posts or standards, and other pads above the pads first named and also secured to said posts or standards, said pads having a bearing upon the nose approximately at the points of a triangle, substantially as specified.

WALTER S. WELLS.

Witnesses:
FREDK. HAYNES,
C. E. SUNDGREN.